Feb. 2, 1960 E. C. WORDEN 2,923,754
METHOD AND APPARATUS FOR MANUFACTURING SYNTHETIC MICA
Filed Aug. 2, 1956 3 Sheets-Sheet 1
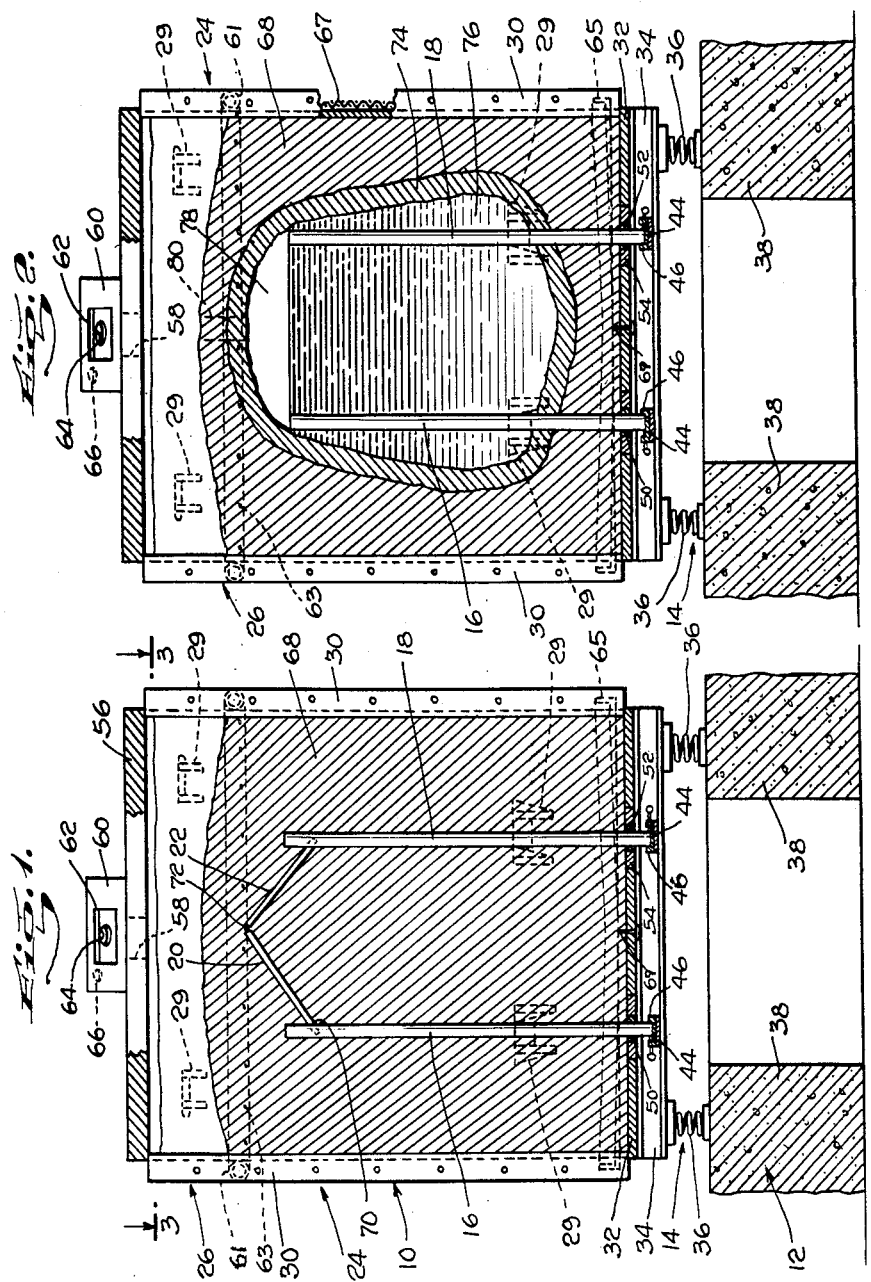
INVENTOR
EDGAR C. WORDEN
BY Hubbell and Cohen
ATTORNEYS

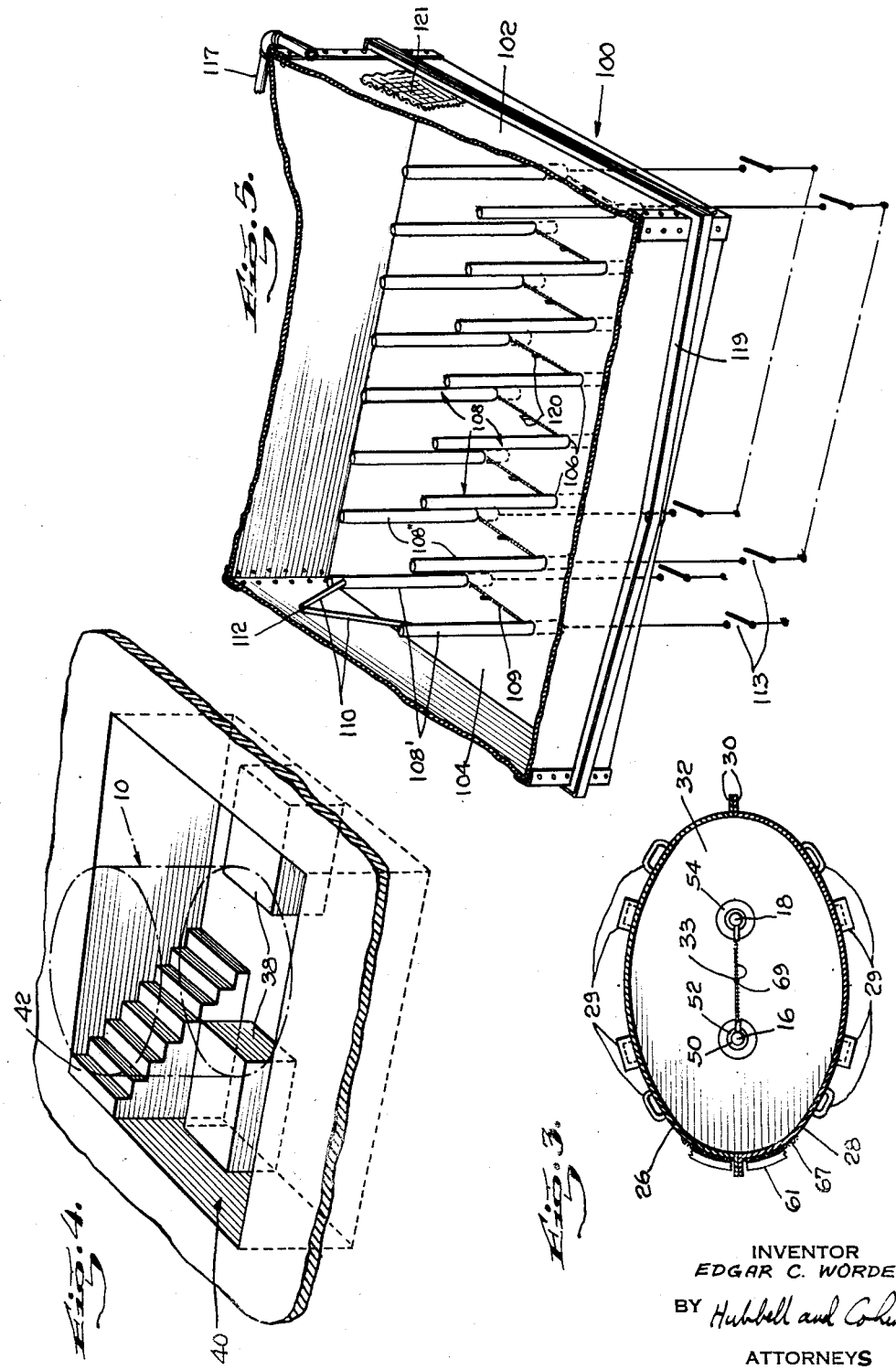

Feb. 2, 1960     E. C. WORDEN     2,923,754
METHOD AND APPARATUS FOR MANUFACTURING SYNTHETIC MICA
Filed Aug. 2, 1956     3 Sheets-Sheet 3
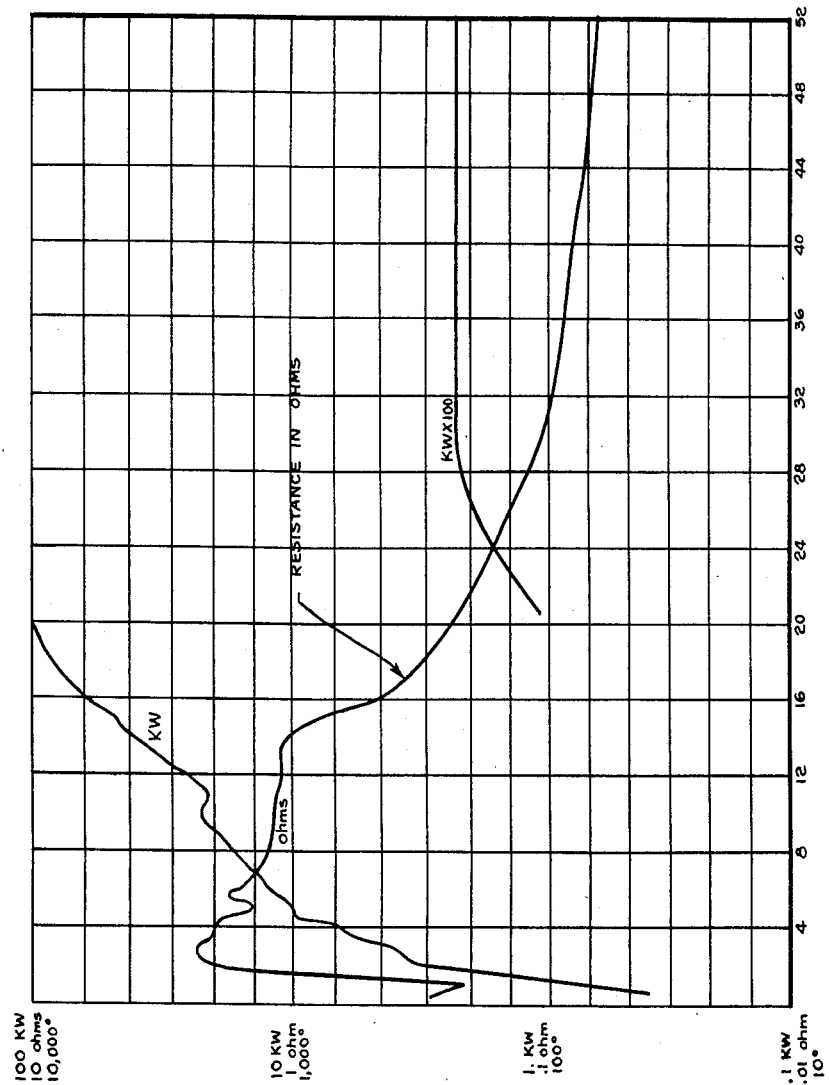
INVENTOR
EDGAR C. WORDEN
BY Hubbell and Cohen
ATTORNEYS

United States Patent Office 2,923,754
Patented Feb. 2, 1960

2,923,754
METHOD AND APPARATUS FOR MANUFACTURING SYNTHETIC MICA

Edgar C. Worden, Cedar Grove, N.J., assignor to Synthetic Mica Corporation, Caldwell Township, N.J., a corporation of New York Application August 2, 1956, Serial No. 601,778

11 Claims. (Cl. 13—23)

This invention relates to apparatus and methods for melting and crystallizing or vitrifying of minerals by conduction heating of raw materials in molten form, and more particularly to a method and apparatus for the synthesis of crystalline micas. Moreover, the invention relates to novel batch compositions suitable for the synthesis of crystalline fluor-micas.

Heretofore, the synthesis of fluor-micas has posed formidable problems especially on a commercial basis. Because of the highly corrosive nature and the high melting temperature of synthetic mica batch materials, the choice of suitable furnace materials for conventional melting techniques has been extremely narrow. Owing to the crystallization of fluor-micas from an incongruent melt, it is necessary to provide fluorine in excess of molecular requirements, as otherwise there would result crystallization of forsterite with fluorine inclusions. The excess of fluorine volatilizes and tends to attack all but a few suitable furnace materials. Recently there have been developed a method and apparatus for melting and crystallization of fluor-micas according to which conventional furnace construction materials can be employed and re-employed for subsequent melting.

In accordance with the aforesaid method, a melt is initiated within the interior of a charge of batch materials by electrical conduction heating of suitable resistance means. After formation of the initial melt, heating and melt enlargement is continued ever-increasingly by conduction heating of the molten batch itself. The melt is contained within the batch material and is not permitted to approach the furnace walls, the melt-surrounding charge acting as an effective vapor seal and thermal insulation for the furnace walls.

While the aforesaid method has proven successful, it is subject to a number of limitations. The initiation of conduction of a melt has not been too dependable, in that frequently the aforesaid resistance means ceased to conduct prior to the formation of a conducting pool of melt. A further limitation of this method lies in the relatively low yield of crystallized product in relation to the total batch material supplied. The crystal growth has been hampered owing to the cooling propagation pattern inherent in this method and also by impurities inevitably present in the batch materials. The impurities are objectionable for the further reason that they are crystallized into the final product, whereby the temperature capabilities, electrical capabilities, and mechanical cohesion of the crystalline mica have been limited.

It is, of course, understood that mica obtained by the aforegoing method is of high purity, higher than is obtainable in mica of natural origin, so that the electrical and thermal properties of the synthetic mica are unquestionably superior to those of natural micas which can be of industrial use. However, industrial needs require ever-increasing chemical purity, thermal endurance, and electrical capabilities. In many commercial applications, as for example in the utilization of mica as a spacer for vacuum tube electrodes, it is of paramount importance to obtain a highly pure mica, capable of withstanding high temperatures and maintain its insulation qualities at these high temperatures. However, in this particular application as well as in some others, additionally it is required that the mica be of large crystal size and highly cohesive, so that electrode spacers and other mica components can be readily punched or mechanically worked.

I have overcome the limitations of the prior art by providing for methods and apparatus according to which the melt is consistently properly initiated and rendered conductive to thereby insure continued melting. I have provided for a furnace configuration and electrode configuration, which in combination effect a much greater yield of crystallized useful product. By a judicious choice of batch materials, even though they be impure, and/or by resorting to a novel pattern of melting and cooling propagation, I have provided purer mica of much larger crystal size than heretofore attained.

It is therefore among the objects of this invention to provide for a new and improved method and apparatus insuring reliable initiation and continuation of a melt of batch materials.

Another object of the invention is to provide for melting apparatus characterized by the conversion of high proportion of the batch material into useful final product.

Yet another object of the invention is to provide highly pure synthetic mica, characterized by excellent mechanical cohesion and large crystal size.

Still another object of the invention is to provide synthetic mica of extremely high thermal resistance and of high insulating qualities at high temperatures.

A further object of the invention is to provide for a novel method of heating and cooling propagation in the melt, whereby crystalline growth is enhanced and impurities may be concentrated at a predetermined location in the final product to thereby obtain purer mica and further enhance crystal growth.

The above and other objects, characteristics and features of the present invention will be more fully understood from the following description taken in connection with the accompanying illustrative drawings.

In the drawings:

Fig. 1 is a sectional view of a furnace for making mica and other minerals showing the furnace prior to institution of the melting operation;

Fig. 2 is a view similar to Fig. 1 showing the furnace during melting operation;

Fig. 3 is a sectional view of the furnace taken along the line 3—3 of Fig. 1, with the batch material removed to more clearly illustrate the features of construction;

Fig. 4 is a perspective view of a support structure for the furnace shown in Figs. 1 to 3;

Fig. 5 is a perspective view of another form of furnace embodying the present invention; and Fig. 6 is a graph illustrating various characteristics of the furnaces shown in Figs. 1 to 5 when used to manufacture mica.

Referring now to the drawings in detail and particularly to Figs. 1 through 4, the furnace 10 is shown mounted on a support base 12 as by a shock mounting 14. The furnace includes a pair of primary electrodes 16 and 18 and associated secondary electrodes 20 and 22, respectively. Furnace 10 may be made of a steel shell 24 and for convenience, the shell comprises two sections 26 and 28 which are joinable as by confronting flanges 30 which are held in confronting relationship in any suitable manner as by bolts and nuts. It will be obvious that other suitable materials such as other metals or plastics may be used to form the shell. In accordance with one highly desirable feature of the present invention as shown in Figs. 3 and 4, the two sections 26 and 28 form an elliptical shell 24. The reason for the elliptical configuration will be come more apparent as this description proceeds. The shell sections 26 and 28 are readily movable as by a fork lift truck engaging projections 29 on the shell, and may be moved over an elliptical base 32 which is mounted on a pair of I-beams 34 carried by shock mounts such as spring shock mounts 36 which are fixedly mounted on concrete pillars 38. When the shell is disposed over the base 32, a sealed connection may be made between the lower edge of the shell and the adjacent portion of the base as by any suitable sealing material such as, for instance, asbestos rope and cement, although other suitable materials may be employed. Suffice it to say that when the shell is properly positioned on the base and the sealing material is positioned along the seam therebetween, the shell and base together form a substantially liquid tight receptacle.

Referring particularly to Fig. 4, the concrete pillars 38 are disposed in a pit 40 positioned below the furnace 10. Access may be had to the pit in any suitable manner as by the stairway 42 extending from an area outside of the furnace into the pit. By providing a pit below the furnace, numerous connections and other necessary adjustments and operations may be conveniently made on the furnace either before, during or after operation thereof. Extending between the lower flanges of I-beams 34 are a pair of mounting boards 44 (Figs. 1 and 2) which may be made of any suitable insulating material such as wood. Disposed on each mounting board is a clamp type electrode holder 46 which is in clamping relationship with its associated electrode 16 or 18. As shown in Fig. 1, the electrodes 16 and 18 extend upwardly from the electrode holders into the elliptical space or chamber defined by the shell through apertures 50 in the base 32. In order to fix the positions of the electrodes 16 and 18 and to prevent leakage of material out through the apertures 50 in the base 32, the portions of the electrodes disposed within the projected area of the base are surrounded with asbestos rope 52 which is in turn surrounded with asbestos cement 54 whereby to seal the apertures 50 and to fixedly hold the electrodes 16 and 18 in vertical disposition.

Preferably, the ellipse defined by the shell 24 has a major to minor axis ratio of 11:9, although other ellipses will be satisfactory. The primary electrodes 16 and 18 are symmetrically located along the major axis with respect to the minor axis and are preferably located at a distance from the minor axis which is less than the focal distance therefrom and most preferably they are located from the minor axis at a distance preferably two-thirds of the focal distance.

The base 32 is preferably made of steel which is relatively inexpensive and has great mechanical strength. However, when electrodes 16 and 18 are energized with alternating current, there is a tendency of large eddy current flow to be set up in the base. In order to reduce this tendency and thereby render the furnace more efficient, base 32 is provided with a slot 33 which extends between the electrode receiving apertures 50. The slot is caulked with non-magnetic material, such as by brazing, in order to prevent leakage. With the non-magnetic caulked slot provided, eddy current losses are minimized.

In order to prevent an excessive amount of fluorine fumes or other fumes from escaping from the furnace during operation thereof, the furnace is provided with a cover 56 which may be of wood or other suitable material. The cover 56 is provided with an aperture 58 through which materials may be introduced from outside the furnace chamber to therewithin. Overlying the aperture 58 is a hood 60 which is preferably triangular in configuration. Along one of the angular surfaces of the hood is an aperture 62 which permits viewing the melt during operation. Along the other angular surface of the hood 60 are two apertures 64 and 66. The aperture 64 is provided to permit introduction of materials into the furnace during operation thereof and the aperture 66 is provided for connection to an exhaust pipe for withdrawing fumes arising from the melt during operation of the furnace.

The temperature at which the batch material is maintained when melted is approximately 1,365° C., which temperature is so high as to cause a softening if not melting of the steel shell surrounding the batch. In order to maintain the integrity of the steel shell 24, adequate cooling means is provided. This means comprises a conduit means or pipe 61 which extends around the periphery of the shell 24 adjacent the top thereof. The pipe 61 is connected to a suitable cold water intake, adapted to be connected to a standard source of water. The pipe 61 is provided adjacent the top thereof with a plurality of openings 63 through which water circulating in the pipe 61 can pass out of said pipe. The holes 63 are directed so as to cause the water to pour onto the shell 24 and thereafter down the shell to a gutter or leader 65 which extends around the periphery of the shell at the bottom thereof. The gutter or leader is provided with a suitable outlet to take off the water therefrom. The water flowing from the pipe 61 to the leader 65 is sufficient to maintain the shell cool and thereby obviate the possibility of damage due to overheating.

To reduce the cold water demand, the downward flow of cold water is obstructed by suitable means such as a fiberglass screen 67 which surrounds the shell 24 and extends between pipe 61 and leader 65. Preferably the screen is in engagement with the shell although it may be closely spaced therefrom. Other suitable screens may be used in lieu of the fiberglass screen.

To further safeguard against overheating of the shell and to insure that the furnace is properly operating, a plurality of thermocouples 69 are disposed in the base 32 of the furnace 10 so as to provide suitable means for determining the temperature of the batch material along the horizontal plane at the bottom of the furnace. Prior to introduction of the batch material 68 into the furnace, the secondary electrodes 20 and 22 are fixed to the primary electrodes 16 and 18, respectively, and are mutually angularly related so as to bring their upper ends into contact with one another, as shown in Fig. 1. The secondary electrodes may be disposed at angles of from 20° to 50° from the horizontal and preferably at 30°. With too small an angle of inclination, the melt does not have sufficient thermal capacity to continuously spread and remain in contact with electrodes 20 and 22 and eventually would become non-conductive, interrupting operation at an incomplete stage. With too great an angle of inclination, the melt would tend to spread considerably laterally of the electrodes without descending quickly. In the meantime local, non-conducting pools would form near electrodes 20 and 22 because of the higher heating rate due to increased conduction through the rather low resistance of the conducting pool formed. The local pools would create voids near the electrodes, and cause premature oxidation and fracture of the electrodes, disrupting the operation. By choosing the angle of inclination to be within the suggested range of 20° to 50° the conducting pool does not spread too far laterally, and at the same time descends quickly enough to absorb local pools.

The most preferred angle of inclination is of such magnitude as to permit the smoothest and non-excessive melt enlargement and descent, so as to ultimately envelope vertical electrodes 16 and 18. As such, of course, optimum angle depends on electrical and thermal conductivity and viscosity of the melt, i.e., on properties inherent in melt composition itself. In practice, I have found an angle of inclination of 30° to be particularly advantageous for melting fluor-mica batches. On the other hand, an angle of inclination of 45° is most desirable when crystallizing magnesium oxide from powder form. The means for securing the secondary electrodes 20 and 22 to the primary electrodes 16 and 18 may be any suitable means. The secondary electrodes are preferably of thinner stock than the primary electrodes 16 and 18 whereby to cause them to have a higher resistance per unit of length than said primary electrodes.

All of the electrodes are made of material which resists the corrosive effect of the batch material and are sufficiently refractory to resist the temperature of the melt. Examples of such materials are platnium, molybdenum, silicon carbide and graphite. Due to the relative costs of these materials, graphite is preferred.

The presently preferred means of securing the primary electrodes to the secondary electrodes is to predrill the primary electrodes whereby to provide a suitable mounting cavity 70 in each primary electrode for its associated secondary electrode. The secondary electrodes fit tightly into the mounting cavities 70 in conducting relation therewith. Moreover, in order to insure for good electrical conduction between said secondary electrodes, lampblack 72 is tamped between the upper ends thereof. It will be seen, therefore, that an electrical circuit is provided extending from the electrode holder 46 through the electrode 16, the electrode 20, the lampblack 72, the electrode 22, the electrode 18 and the electrode holder 46, whereby when the electrode holders are energized, electric current will flow through the above mentioned circuit and thereby heat the surrounding batch material. Moreover, it will be apparent that the maximum heat created by the flow of current through the circuit will be concentrated in the area of maximum resistance defined by the secondary electrodes 20 and 22 and particularly by the lampblack 72.

Before describing the operation of the furnace shown in Figs. 1 to 4, I will explain the nature of the batch materials to be used to make synthetic fluor-phlogopite mica. Fluor-phlogopite mica has the following chemical formulation:

$$K_2Mg_6Al_2Si_6O_{20}F_4$$

Theoretically, the batch material should have sufficient quantities of each of the elements appearing in fluor-phlogopite mica to combine and achieve the fluor-phlogopite formulation. However, as has been indicated hereinbefore, the fluorine in the batch material tends to volatilize and pass away from the batch. Accordingly, an excess of fluorine must be present. I have found that to make one mole of fluor-phlogopite mica, 4.12 to 6 moles of fluorine should be present, and preferably 4.12 to 4.5 moles should be present. Similarly, it may be desirable to provide a slight excess of potassium to allow for volatilization of that element. A suitable range of potassium to achieve one mole of synthetic fluor-phlogopite mica would be to provide for 2 to 2.5 moles of potassium and preferably from 2 to 2.1 moles. It will be understood, however, that it is not absolutely necessary to provide an excess of potassium in the same manner as it is necessary to provide for an excess of fluorine. Moreover, when making a batch composition, it is not necessary to have precisely the right amount of oxygen present since any excess of oxygen will be driven off during the reaction of the batch materials and conversely, any deficiency in oxygen may be replenished from the atmosphere. The mole composition for the batch material may fall within the following ranges:

|  | Moles |
|---|---|
| Potassium | 2 to 2.5 |
| Magnesium | 6 |
| Aluminum | 2 |
| Silicon | 6 |
| Oxygen | 18 to 22 |
| Flourine | 4.0 to 6 |

As was suggested hereinbefore, the preferred ranges of mole composition are as follows:

|  | Moles |
|---|---|
| Potassium | 2 to 2.1 |
| Magnesium | 6 |
| Aluminum | 2 |
| Silicon | 6 |
| Oxygen | 20 |
| Flourine | 4.12 to 4.5 |

One example of a suitable batch is:

|  | Percent |
|---|---|
| $K_2SiF_6$ | 19.4 |
| Orthoclase feldspar | 19.0 |
| $SiO_2$ | 23.9 |
| $Al_2O_3$ | 8.8 |
| MgO | 28.9 |

Other satisfactory batches may be determined in line with the ranges of mole compositions set forth hereinbefore to yield fluor-phlogopite mica. If other types of mica are desired other batch compositions are necessary.

The batch materials are poured into the furnace chamber and may be tamped during loading. Preferably the batch materials cover both the primary and secondary electrodes to minimize oxidation thereof. The top is placed over the furnace shell and the primary electrodes are energized, as by standard 60 cycle alternating current. As current flows through the aforedescribed circuit, heat is generated. The maximum heat concentration will be adjacent the lampblack 72 which is of maximum resistance, whereby to cause a melting of the batch material immediately adjacent thereto. The melted batch material is conductive and, accordingly, a conducting path through the melt is provided between the secondary electrodes 20 and 22. However, the heat will still be concentrated in the secondary electrodes and the pool of molten material will continue to grow downwardly from the apex of the angle formed by the secondary electrodes. Due to the tremendous heat and the presence of oxygen, the lampblack oxidizes and vanishes. Moreover, the secondary electrodes may tend to oxidize and volatilize and thereby disintegrate although this is not necessarily the case. Regardless of whether or not the secondary electrodes vanish, the growth of the molten material will proceed downwardly due to gravity and the angular relation of the secondary electrodes until finally a conducting path is provided by the molten material directly between the primary electrodes 16 and 18, as shown in Fig. 2. At this point, if the secondary electrodes have not vanished, they may be mechanically removed in order to prevent contamination of the melt with carbon. Power is continued to be supplied to the primary electrodes whereby to cause the molten mass to continue to grow with a sintered region 74 immediately surrounding the molten mass. It will be seen from a perusal of Fig. 2 that the molten batch material 76 takes up a far smaller volume than the same material in raw powdered form as originally introduced into the furnace. Accordingly, a void 78 develops along the top of the pool. In order to insure that a maximum volume of finished mica is yielded from the melt and to prevent oxidation of the primary electrodes, a hole or passage 80 is poked through the crown of the batch material and additional batch material is periodically added, whereby to tend to partially fill up the void, preferably to the tops of the primary electrodes. Moreover, with the hole or passage 80 driven through the crown, fluorine and other gases are permitted to escape from the void 78 and these gases are drawn off through the aperture 66 in the hood 60.

In accordance with one of the highly desirable features of the present invention, when using two spaced electrodes such as primary electrodes 16 and 18, the molten material tends to propagate itself in the form of an ellipsoid. Due to the fact that the molten material is at a temperature of approximately 1,365° C., which temperature would be extremely injurious to the shell 24, it becomes undesirable for the molten material to come into contact with the shell. This is further undesirable due to the fact that the shell may provide a short circuit electrical path whereby to cause undue power demands on the power supply for the furnace. Accordingly, it is desirable to have at least a sintered mass 74 isolate the shell from the molten pool 76. This, of course, tends to require the furnishing of batch material which is not converted into mica. However, in order to make the process as efficient as possible, the shell is elliptical in cross section, whereby a minimum amount of material is necessary to effect an insulation of the shell from the molten pool. It should be noted, however, that any material not converted to mica may be ground and reused in a subsequent melt.

Referring to Fig. 6, the graph illustrates various characteristics of the furnace versus time. The resistance between the electrode holders 46 is shown to very rapidly drop for a short period of time after energization and thereafter to rise sharply. This short drop is due to the negative temperature coefficient of graphite which during the early period of energization is being warmed plus the initiation of conduction through the melt in parallel with conduction through the lampblack. The steep rise in resistance occurs when the lampblack 72 becomes consumed through oxidation and the only electrical path between the secondary electrode is the molten pool. Thereafter, the resistance gradually drops in an asymptotic curve as the pool of melted batch material becomes gradually larger and larger to provide a larger conducting path for the electric curent. The power consumption on the other hand rises asymptotically as the resistance drops which, of course, is to be expected.

As is stated hereinbefore, during the time that the melt is progressing outwardly towards the shell, batch material is intermittently added through the cavity 80 in order to insure a large volume of finished mica. This continues until the melt has progressed to the point where it is in danger of engaging the shell at which time the electrodes are deenergized and the batch material is permitted to cool. As the batch material cools, it forms into flakes or books of mica and with the batch material stated herein in flakes or books of fluor-phlogopite mica. Depending on the volume of the molten mass, the cooling period may take from days to weeks and when the mass has become sufficiently cool to be safely worked on, the shell may be dismantled by removing the securing elements extending through the flanges 30 and removing the shell from around the solidified mass. Thereafter, any unsintered or crystallized batch material surrounding the mica may be removed in any suitable manner as by a jack hammer and a jack hammer or crushing mechanism may be used to break up the mass of mica.

Although the method and apparatus hereinbefore described has been satisfactorily used to manufacture good quality synthetic fluor-phlogopite mica, there are several disadvantages to this method and apparatus. Specifically, one of the disadvantages is that certain impurities do not liquefy at the temperature of the molten mica and provide suitable seeds for the growth of mica crystals, whereby to cause excessive seeding and therefore an excessive number of small mica crystals.

Referring now to Fig. 5, an alternative embodiment of the present invention is shown wherein some of the shortcomings of the apparatus shown in Figs. 1 to 4 are obviated. Referring to Fig. 5, a furnace 100 is shown having a rectangular shell 102. The rectangular shell may be formed in any suitable manner and can preferably be dismantled. One manner of achieving such a construction is to use angle irons at the corners to hold adjacent perpendicular plates in fixed relationship, as shown in Fig. 5. The base 104 is provided with a plurality, here shown as eight in number, of pairs of apertures 106 through which vertically extending primary electrodes 108 extend. The base 104 may be mounted on I-beam 34 in much the same manner as base 32 is mounted thereon, as shown in Figs. 1 and 2. The electrodes 108 may be held in a vertical position by electrode holders of construction similar to those designated as 46 and 48 in Figs. 1 and 2. Brazed slots 109 extend between the electrodes of each pair to reduce eddy current loss. One pair of electrodes 108' is provided with secondary electrodes 110 which are angularly related with the same relationship as that discussed with regard to secondary electrodes 20 and 22. These electrodes 110 have disposed therebetween at the tops thereof lampblack 112.

In accordance with the present invention, it is my intention to successively energize the pairs of electrodes in the furnace 100 so as to progress the melt from one end of the furnace to the other and to successively deenergize the electrodes in the same order whereby to cause a progressive cooling of the batch material in the same direction after it has been liquefied. Accordingly, the first pair of electrodes energized are the electrodes 108' which are adapted to start the melt due to the provision of the secondary electrodes 110. The melt progresses in much the same way as does the melt in the furnace 10 until a molten pool extends between the next pair of electrodes 108''. At about this time the electrodes 108'' are energized and the electrodes 108' remain energized. Acceleration of the melting may be attained by energizing each successive pair of electrodes prior to the molten pool extending between the electrodes in each of said pairs. Thereafter, the next pair of electrodes are energized when the molten material is disposed therebetween to provide a conducting path therefor, or prior thereto, and so on until the right hand pair of electrodes is energized. In cooling or deenergizing the electrodes, the same procedure is followed. That is, first the electrodes 108' are deenergized and subsequently the electrodes 108'' are deenergized, and thereafter each successive pair of electrodes is deenergized until all the electrodes are deenergized. I presently prefer to deenergize the first pair of electrodes 108' at the time that I energize the fifth pair from the left although other possible progressions may be followed. When this procedure is followed it will be clear that the maximum number of pairs of electrodes simultaneously energized is four. The selective and progressive energization of the electrodes 108 may be effected by manually closing and opening knife switches 113 which are in series with the electrodes, or it may be done by any other suitable means, either manual, semi-automatic or automatic.

By progressively melting and cooling the batch material in the manner stated hereinbefore, I have found that the impurities tend to move to the right as viewed in Fig. 5, along with the advancing front of molten material, thereby tending to concentrate most of the impurities at the right hand end of the batch. Accordingly, the left hand end of the batch tends to be relatively free from impurities and thereby have few seeds to form crystals. This will result in a fewer number of crystals but these crystals will be of large size. Moreover, by gradually progressively cooling the molten mass, it will be seen that there will be a temperature gradient extending from a minimum temperature at the left to a maximum temperature at the right during the cooling process. I have found that the crystals tend to orient themselves along this temperature gradient whereby to yield many similarly oriented crystals which are often referred to as books of mica. This obviates another of the shortcomings of the furnace illustrated in Figs. 1 to 4 in which the mica crystals do not always form in a truly organized pattern of orientation and often tend to orient themselves into tetrahedrons rather than into books.

The furnace 100 may be provided with a peripheral water pipe 117 which is provided with apertures in order to provide a suitable means for cooling the furnace wall in the same manner as the furnace 10 is provided with such means. A gutter or leader 119 is provided near the bottom to collect the water. A fiberglass screen 121 may be connected to the outer peripheral surface of the furnace between pipe 117 and leader 119 to slow down the descent of the water coolant. Moreover, as is shown in Fig. 5, the furnace 100 is provided with a number of thermocouples 120 fixed in the bottom thereof in order to keep a constant check on the temperature in the furnace at various locations.

Having thus described several embodiments of the present invention, it will be understood that various changes and modifications may be made therein within the scope of the appended claims without departing from the spirit and scope of this invention.

What I claim is:

1. A furnace for resistance melting a charge of powdered and granulated material, comprising a shell defining a charge receiving chamber, a pair of spaced main electrodes disposed within said chamber and adapted to be electrically energized to supply electric energy to the furnace charge to heat the latter, and a pair of angularly related secondary electrodes conductively connected to said main electrodes and being in mutual conducting relationship.

2. A furnace for resistance melting a charge of powdered and granulated material, comprising a shell defining a charge receiving chamber, a pair of spaced main electrodes disposed within said chamber and extending upwardly from the bottom thereof, said main electrodes being adapted to be electrically energized to supply electric energy to the furnace charge to heat the latter, and a pair of secondary electrodes conductively connected to said primary electrodes and extending towards each other at angles to the horizontal, the unconnected ends of said secondary electrodes being in conducting relationship with one another at a point above and between the points of connection of said secondary electrodes with said main electrodes.

3. A furnace as defined in claim 2, wherein said angles at which said secondary electrodes are disposed relative to the horizontal range from 20° to 50°.

4. A furnace as defined in claim 2, wherein said angles at which said secondary electrodes are disposed relative to the horizontal are substantially 30°.

5. A furnace for resistance melting a charge of powdered and granulated material, comprising a shell defining a charge receiving chamber, a pair of vertically extending parallel spaced main electrodes disposed within said chamber and adapted to be electrically energized to supply electric energy to the furnace charge to heat the latter, and a pair of secondary electrodes conductively connected to said primary electrodes and extending towards each other at angles to the horizontal, the unconnected ends of said second electrodes being in conducting relationship with one another at a point above and between the points of connection of said secondary electrodes with said main electrodes.

6. A furnace as defined in claim 5, wherein said angles at which said secondary electrodes are disposed relative to the horizontal range from 20° to 50°.

7. A furnace as defined in claim 5, wherein said angles at which said secondary electrodes are disposed relative to the horizontal are substantially 30°.

8. A furnace for resistance melting a charge of powdered and granulated material, comprising a shell defining a charge receiving chamber, a pair of vertically extending parallel spaced main electrodes disposed within said chamber and adapted to be electrically energized to supply electric energy to the furnace charge to heat the latter, and a pair of secondary electrodes conductively connected to said primary electrodes and extending towards each other at angles to the horizontal, the unconnected ends of said secondary electrodes being in conducting relationship with another at a point above and between the points of connnection of said secondary electrodes with said main electrodes, and deformable conducting material disposed between said unconnected ends of said secondary electrodes in conducting relationship therewith to insure the initial flow of electricity through said furnace.

9. A furnace as defined in claim 8, wherein said deformable conducting material is lampblack.

10. A furnace for resistance melting a charge of powdered and granulated material, comprising a shell and a ferrous base therefor, said shell and base defining together a charge receiving chamber, a pair of electrodes extending upwardly through said base into said chamber, said base being provided with a slot extending substantially from electrode to electrode, and non-magnetic caulking material disposed in said slot to maintain the material containing integrity of said base and to reduce eddy current flow therewithin.

11. A furnace for resistance melting a charge of powdered and granulated material, comprising a shell and a ferrous base therefor, said shell and base defining together a charge receiving chamber, a pair of electrodes extending upwardly through said base into said chamber, said base being provided with a slot extending substantially from electrode to electrode, said base being brazed to fill in said slot, whereby to maintain the material containing integrity of said base and to reduce eddy current flow therewithin.

References Cited in the file of this patent

UNITED STATES PATENTS

| | | |
|---|---|---|
| Re. 13,027 | Higgins | Oct. 26, 1909 |
| 775,654 | Higgins | Nov. 22, 1904 |
| 885,934 | Machalske | Apr. 28, 1908 |
| 914,489 | Hall | Mar. 9, 1909 |
| 1,309,045 | Moore | July 8, 1919 |
| 1,326,083 | Moore | Dec. 23, 1919 |
| 1,418,984 | Sperr et al. | June 6, 1922 |
| 2,108,577 | Brough | Feb. 15, 1938 |
| 2,490,339 | De Voe | Dec. 6, 1949 |
| 2,711,435 | Humphrey | June 11, 1955 |
| 2,719,799 | Christian | Oct. 4, 1955 |